Aug. 27, 1963  E. J. NUNLIST  3,101,962
APPARATUS FOR COUPLING SHAFTS
Filed Jan. 16, 1961  2 Sheets-Sheet 1
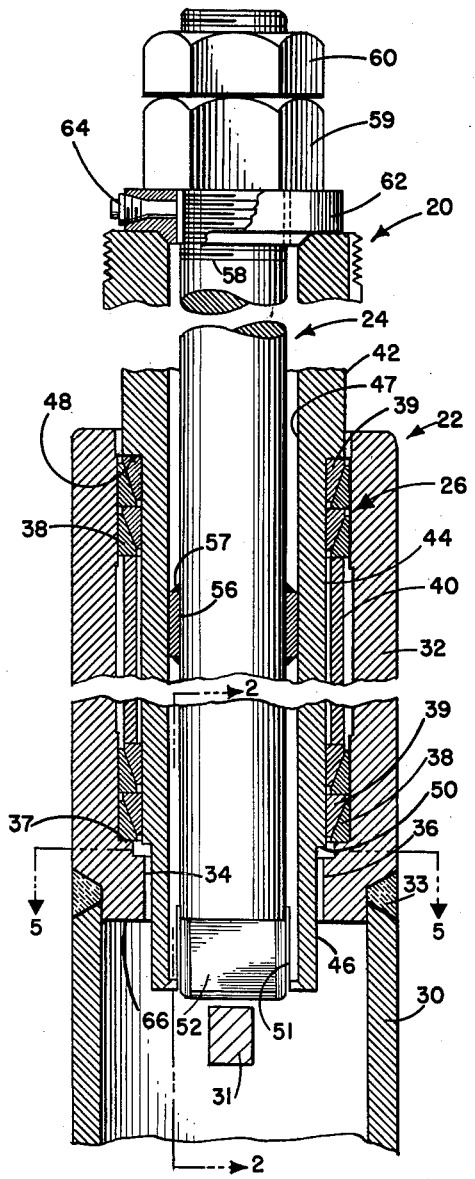
Fig. 1
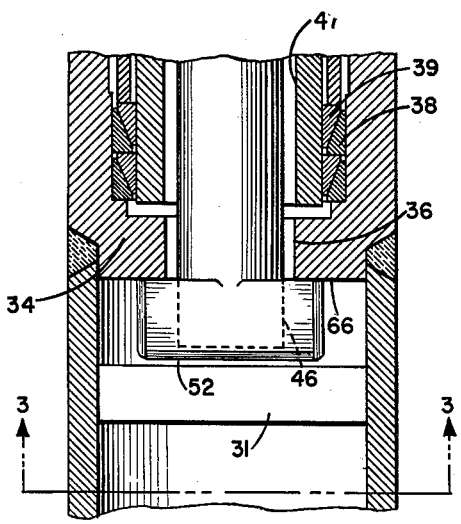
Fig. 2
Fig. 3
INVENTOR.
ERWIN J. NUNLIST
BY
ATTORNEYS Aug. 27, 1963 E. J. NUNLIST 3,101,962
APPARATUS FOR COUPLING SHAFTS
Filed Jan. 16, 1961 2 Sheets-Sheet 2

INVENTOR.
ERWIN J. NUNLIST

BY

ATTORNEYS

United States Patent Office 3,101,962
Patented Aug. 27, 1963

3,101,962
APPARATUS FOR COUPLING SHAFTS
Erwin J. Nunlist, Rochester, N.Y., assignor to Pfaudler Permutit, Inc., Rochester, N.Y., a corporation of New York
Filed Jan. 16, 1961, Ser. No. 83,081
6 Claims. (Cl. 287—114)

This invention relates to methods and apparatus for coupling shafts, as for example the coupling of the drive shaft of an agitating or mixing device with the agitator driven thereby, one object of the present invention being to provide an apparatus of the above character which is more practical and efficient than those presently in use.

This invention is particularly adapted for use with glass or ceramic coated agitators or shafts. It has never been found practical to utilize flanged couplings or other couplings, in common use with non-coated shafts, for connecting coated shafts.

In the past, one of the practices for coupling driving shafts to coated shafts of the above stated nature was by threading the driving shaft into the top of the driven shaft or agitator. Because of the corrosive properties of many of the substances being mixed by the driven shaft or agitator, this old type of coupling device created many problems relative to the uncoupling of the shafts.

A coupling arrangement whereby the driving and driven shafts were keyed together was also of common practice in the past. This coupling arrangement, however, presented two distinct disadvantages, the first being the weakening of the shafts and the requisite tolerance between the parts being the second disadvantage.

It is one object of my invention to eliminate threads between the driving and driven shafts being coupled together.

It is a further object of my invention to provide apparatus for coupling driving and driven shafts together which eliminates requisite tolerances between abutting parts of keyed shafts.

A further object contemplated by my invention is the provision of apparatus for wedging the driving and driven shafts together to thereby eliminate looseness therebetween, increase torque transmitting capacity, and provide a leak-proof connection.

My invention also contemplates as one of its objects apparatus for more conveniently assembling and disassembling the parts constituting the couple.

Another object of my invention is the provision of auxiliary or secondary apparatus for preventing the coupled shafts from dislodging upon failure of the wedging device.

A still further object of my invention is the provision of apparatus which insures that the driving and driven shafts cannot be dislodged inadvertently during the disassembly and loosening of the connection created by the wedging device.

Other objects and advantages of my invention will be particularly set forth in the claims and will be apparent from the following description when taken in connection with the accompanying drawings, in which:

FIG. 1 is a fragmentary longitudinal cross-sectional view of the driving and driven shafts and wedging device therebetween of one embodiment of this invention;

FIG. 2 is a cross-sectional view taken substantially on the line 2—2 of FIG. 1 looking in the direction indicated by the arrows;

FIG. 3 is a cross-sectional view with parts broken away taken substantially on the line 3—3 of FIG. 2 looking in the direction indicated by the arrows;

Figure 4:
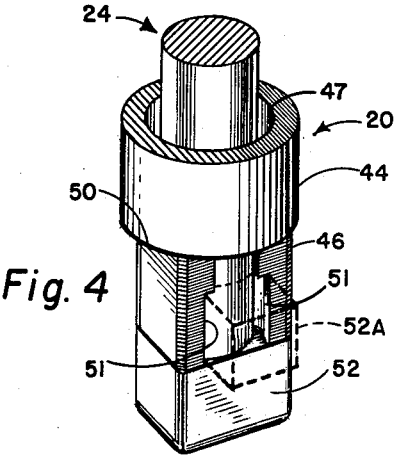
FIG. 4 is a fragmentary perspective view of the lower end of the driving shaft and draw bar.

The preferred embodiment of the present invention herein disclosed by way of illustration, comprises a quill or driving shaft generally indicated by the numeral 20 (FIG. 1), an agitator or driven shaft generally indicated by the numeral 22, draw bar or locking member generally indicated by the numeral 24 and a plurality of annular wedge or gripper spring elements generally indicated by the numeral 26.

Briefly, in operation the draw bar 24 is longitudinally inserted into the driving shaft 20 from the lower end of the driving shaft. The plurality of gripper spring elements 26 are longitudinally inserted into the bore of the agitator 22 from the top and then the draw bar 24 and quill 20 are inserted through the center of the plurality of wedge elements 26. Thereafter, the draw bar 24, quill 20, agitator 22 and the plurality of gripper spring elements 26 are interlocked and coupled together in a manner to be hereinafter described.

Figure 5:
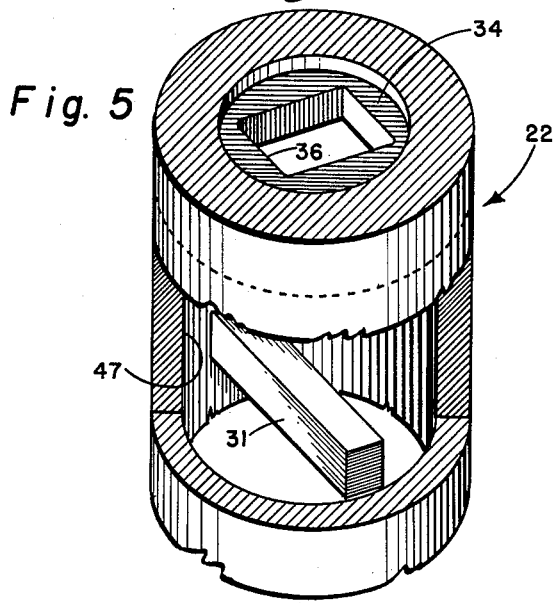
FIG. 5 is a fragmentary perspective view with parts broken away in cross-section taken substantially on the line 5—5 of FIG. 1 looking in the direction indicated by the arrows.

In the preferred embodiment of this invention as illustrated, the agitator 22 comprises a lower hollow shaft portion 30 having agitator blades (not shown) mounted at its lower end. A cross-bar or cross-member 31 transversely mounted in the lower hollow shaft portion 30 serves a purpose to be described hereinafter. An upper hollow shaft portion 32 is rigidly connected to the lower hollow portion 30, as for example by a weld 33. As illustrated in FIGS. 1, 2 and 5, the upper hollow portion 32 is provided with a partition 34 having a noncircular opening 36. Portion 32 is interiorly provided with an annular shoulder 37 (FIG. 1).

The shoulder 37 supports an outer wedge or gripper spring element 38. The outer gripper spring element 38 is wedge-shaped or beveled on one edge and adapted for mating with a somewhat smaller-in-diameter inner gripper spring element 39 also of wedge shape or beveled to mate with the beveled edge of gripper spring elements 38.

Four sets of the mating gripper spring elements 38 and 39, two sets positioned at the lower interior region of the upper hollow shaft portion 32 and the other two sets substantially at the top thereof, are spaced by a hollow, cylindrical gripper spring spacer 40. As will be understood from the detailed description hereinafter of the coupling procedure of the shafts 22 and 20, the spacing of the two sets of gripper spring elements 38 and 39 is to provide means for rigidly aligning an extended length of the shafts 20 and 22. It will be understood that this arrangement could be replaced by providing male and female mating beveled or conical shaped surfaces on the shafts 20 and 22, respectively, which extend substantially the same axial length as that provided by the illustrated combination of gripper spring elements 38 and 39 with the spacer 40.

The quill or driving shaft 20 consists of three separate portions, a large diameter shaft portion 42, a small diameter shaft portion 44 and a non-circular in transverse cross-section shaft portion 46 substantially defining a rectangular parallelepipedon at the lower-most end thereof (see FIG. 4). Non-circular opening 36 is adapted to receive non-circular portion 46 therethrough when in registry. Shaft 20 has a bore 47 extending longitudinally through all portions.

A shoulder 48, provided where the bottom of the large diameter shaft portion joins the top of the small diameter shaft portion, is adapted to engage the upper-most gripper spring element 39. A shoulder 50 (FIG. 4), provided where the lower end of the small diameter shaft portion 44 joins the upper end of the non-circular shaft portion 46, is adapted to limit the length of driving shaft 20 which may be received by non-circular opening 36 (FIG. 5).

The non-circular shaft portion 46 is provided with a non-circular shaped slot or opening 51 (FIG. 4) extending transversely therethrough which intersects bore 47 to define a pair of tines. The cross section of these tines may be seen in FIG. 3. Opening 51 is adapted to receive a T-head or non-circular in transverse cross-section member 52 rigidly mounted at the lower end of draw bar 24. However, the non-circular shaft portion 46 must be provided with a slot or opening, such as 51, which is adapted to receive the T-head 52 in the relationship illustrated in FIG. 1 and as shown in broken lines in FIG. 4.

As viewed in FIG. 4, it can be seen that the T-head 52 is a rectangular parallelepipedon conforming in transverse cross-section substantially to that of the transverse cross-section of the lower non-circular shaft portion 46 of the driving shaft 20. This arrangement permits the T-head 52 and non-circular shaft portion 46 to be brought into alignment for insertion through the non-circular opening 36.

Draw bar 24 is provided with a concentric bushing 56 rigidly mounted thereon, as for example by a weld 57; this bushing is received by the bore 47 of the driving shaft 20; thereby to facilitate the alignment of the draw bar 24 with respect to the driving shaft 20.

The upper end of the draw bar 24 is threaded at 58 to receive a draw bar nut 59 and a jam nut 60. Before the nuts 59 and 60 are threaded onto the threaded portions of 58 for the purposes to be described hereinafter, the draw bar 24 receives a non-threaded tapered washer 62 provided with a vent plug 64. The interior bore of washer 62 is concentrically spaced from the draw bar 24 to provide a passage from bore 47 to plug 64. The vent plug 64 is provided for release of any fluid pressure inside the driving shaft 22 if desired. The gripper spring elements 38 and 39 form a seal between the driving shaft 20 and the driven shaft 22. The plurality of gripper spring elements 26 provides a seal between the driven shaft 22 and driving shaft 20. The tapered washer 62 provides a seal between the draw bar 24 and the driving shaft 20.

It will be understood that this type of coupling has been specifically developed for use with glass or ceramic coated agitators. Although a ceramic coating on the exterior surface of the agitator shaft 22 is not illustrated, it will be understood that the method and apparatus described and claimed herein are particularly useful with this type of an agitator. In the past, it has been necessary to internally thread or key ceramic coated agitator shafts to lock with the driving shaft; neither of these constructions provided a satisfactory coupling arrangement. Threaded interlocking shafts were not satisfactory because of corrosion, and keyed shafts required close tolerances between locking parts.

In operation, the gripper spring elements 38 and 39 are preferably coated with a lubricant to prevent corrosion and to facilitate disassembly. Two sets of the lubricated gripper spring elements 38 and 39 are placed at the bottom of the interior bore of the upper hollow shaft portion 32 of driven shaft 22 where they are supported by the shoulder 37. The gripper spring spacer 40 is then inserted in the interior bore of the upper hollow shaft portion 32 above which are placed two more sets of lubricated gripper spring elements 38 and 39. All four sets of gripper spring elements preferably are inserted in the same direction.

With reference to FIGS. 4 and 5, when the operator is ready to couple the driving shaft 20 to the driven or agitator shaft 22, the draw bar 24 is longitudinally inserted through the bore 47 of the driving shaft 20 from the lower end thereof until the T-head 52 engages the lower end of the non-circular portion 46. The T-head 52, as shown in solid lines in FIG. 4, is brought into alignment with the non-circular portion 46. While these parts are in proper alignment, the nut 59 is threaded downwardly until the washer 62 is brought into locking engagement with driving shaft 20, thereby securing T-head 52 in rigid alignment with non-circular shaft portion 46 as shown in solid lines in FIG. 4.

The aligned T-head 52 and non-circular portion 46 are inserted longitudinally downward through the center of the gripper spring elements 38 and 39 in the driven shaft 22 and brought into alignment with the non-circular opening 36 for insertion therethrough until the T-head 52 engages a cross bar 31.

Figure 6:
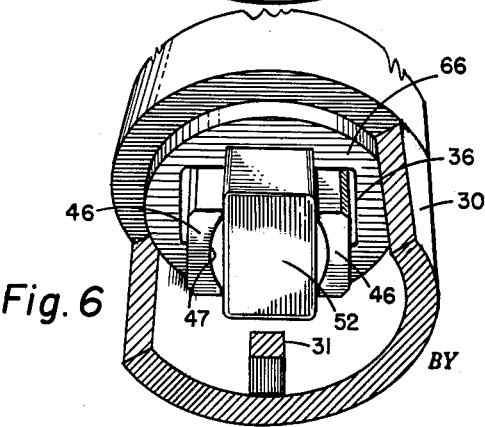
FIG. 6 is a fragmentary perspective view with parts broken away in cross-section of the lower end of the apparatus as shown in FIG. 1.

The nut 59 is backed off of threads 58 to loosen the T-head 52 and the draw bar 24 is then rotated 90°, at which position the T-head 52 is aligned with the cross bar 31 below and slot 51 above. The nut 59 is then threaded downwardly on the threaded portion 58 of the draw bar, thereby raising the T-head 52 into slot 51 as illustrated in broken lines in FIG. 4 to engage a lower surface 66 of partition 34 as illustrated in FIGS. 2 and 6. The drawbar 24 with the nut 59 being threaded downwardly coacts as a vise to force the driving shaft 20 and gripper spring elements 38 and 39 downwardly to the position illustrated in FIGS. 1, 2 and 6.

In the latter position, it is impossible for the draw bar 24 to turn relative to the driving shaft 20, and, at the same time, the driving shaft 20 is locked against rotation in the non-circular opening 36. The combination of these two locking relationships provides an interlocking of the draw bar 24, the driving shaft 20 and driven shaft 22 against relative rotation and longitudinal movement. It will be understood from the drawings that the parts are relatively loose fitting so as not to require precision tolerances between mating parts; this contributes to the all over financial savings of this coupling arrangement.

With my arrangement, the tines formed by the non-circular opening 51 cut through the non-circular shaft portion 46 will normally not transmit any torque. The gripper spring elements 38 and 39 usually transmit the torque. Non-circular shaft portion 46 inserted into non-circular opening 36 provides a dependable secondary engagement between the driving shaft 20 and the driven shaft 22 for torque transmission.

The final tightening of the draw bar 24 by the application of clockwise force, to the nut 59, as viewed from the upper end of FIG. 1, transmits a longitudinal component force from the draw bar 24 to the upper end of the driving shaft 20. The draw bar 24 acts as a vice transmitting an upward longitudinal component force from the T-head 52 to the partition 34 and driven shaft 22, to thereby compress the gripper spring elements 38 and 39 between the driving shaft shoulder 48 and the driven or agitator shaft 37.

This tightening of the draw bar is vital to interlock the draw bar 24 and shafts 20 and 22 against relative rotational and longitudinal movements. It will be understood that, by transmitting axial force through the draw bar 24 to opposite ends of the two shafts 20 and 22, the inner gripper spring elements 39 tend to be reduced in diameter and are pressed against the driving shaft 20 and the outer gripping spring elements 38 tend to expand in diameter and be pressed against the interior bore of the driven shaft 22. This accomplishes an accurate and rigid alignment of the parts, eliminating any possible looseness, and serves as a pressure-tight joint through which torque is normally transmitted. The amount of torque transmission is, of course, dependent on the magnitude of the force applied by the nut 59. After sufficient force has been applied to nut 59, the jam nut 60 is turned clockwise as viewed from the upper end of FIG. 1, thereby locking the nut 59 in the selected position on threads 58 of the draw bar 24.

FIGS. 1, 2, 3 and 6 illustrate the respective positions of parts when the couple therebetween has been completed and all parts are interlocked.

In operation, when the operator wants to uncouple the driving shaft 20 from the agitator or driven shaft 22, the jam nut 60 and nut 59, respectively, are backed off of the threads 58, thereby permitting the draw bar 24 to move downwardly. The T-head 52 will engage the cross bar 31 to break the couple between the driving and driven shafts. This guarantees that the couple is broken and the driven shaft 22 will fall onto the T-head 52 before it is possible for the T-head 52 to be free from the opening 51. Because of the unique interlocking of parts described above, there is no danger of the driven shaft 22 falling off the T-head 52 so long as the T-head 52 remains in the slot 51.

If any difficulty should arise in uncoupling the shafts 20 and 22, the driven shaft 22 should be secured against longitudinal movement by auxiliary means and the nuts 59 and 60 backed off the threads 58 a sufficient distance to permit the T-head 52 to forcibly tap the cross bar 31, thereby breaking the couple created by gripper spring elements 38 and 39. The possibility of the T-head 52 being rotated 90° during the process of tapping the driven shaft 22 loose from the coupling above described, necessitates the auxiliary securing thereof.

Once the couple has been broken, the driven shaft 22 should be secured if not having been done before. Then, the T-head 52 should be lowered below the non-circular shaft portion 46 and thereafter turned 90° so as to bring it into alignment with the lower end of the non-circular portion 46. Then the draw bar 24 and driving shaft 20 may be withdrawn from the driven shaft 22.

While I have shown and described the preferred embodiments of my invention, it will be understood that various changes and modifications may be made therein, particularly in the form and relation of parts, without departing from the spirit of my invention as set forth in the appended claims.

I claim:

1. A shaft coupling device comprising, in combination, a driven shaft, a driving shaft telescopically fitting into said driven shaft, one of said shafts having a non-circular portion and the other of said shafts having a non-circular opening adapted to receive said non-circular portion, wedge means intermediate said driven and driving shafts adapted for transmitting torque between said shafts, draw bar means engaging substantially opposite ends of said shafts for compressing said wedge means to transmit torque and for maintaining said non-circular portion in said non-circular opening.

2. A shaft coupling device comprising, in combination, a draw bar, a T-head having a non-circular transverse cross-section mounted on the lower end of said draw bar, a hollow driving shaft having a non-circular cross-sectional lower end, said driving shaft being adapted to telescopically receive the upper end of said draw bar, said driving shaft having a non-circular transverse slot in the lower end thereof adapted to receive said non-circular T-head, a hollow driven shaft, a partition mounted transversely in said driven shaft, said partition having a non-circular opening therethrough adapted to receive said T-head and lower end of said driving shaft, wedge means intermediate said driven and driving shafts for locking said driven and driving shafts against relative rotational and longitudinal movement, and means for applying axial force between said draw bar and upper end of said driving shaft thereby transmitting force from said non-circular T-head to said driven shaft partition to said wedge means thereby actuating said wedge means to lock said driven and driving shafts together.

3. A shaft coupling device in accordance with claim 2 in which said wedge means comprise a plurality of outer rings engaging said driven member, the lower most outer ring being shouldered against said driven shaft, and a plurality of inner rings adapted to wedge with said outer rings, said inner rings engaging said driving shaft, the uppermost inner ring being shouldered against said driving member.

4. A shaft coupling device in accordance with claim 2 including means between said T-head and driven shaft for limiting the axial length of said draw bar which can be received by said partition opening.

5. A shaft coupling device comprising, in combination, a hollow driving member, a hollow driven member in telescoping relation thereto, wedge means between said members adapted for frictionally locking said members together, and vise means coactive on both of said members for simultaneously applying opposing forces to said members to render said wedge means effective to lock said members together.

6. A shaft coupling device comprising, in combination, a driven shaft, a driving shaft, wedge means intermediate said driven and driving shafts adapted for transmitting torque between said shafts, vise means coactive on both of said shafts for forcing said wedge means into engagement with both of said shafts to transmit torque, and auxiliary means coactive with said shafts for transmitting torque from said driving shaft to said driven shaft.

References Cited in the file of this patent

UNITED STATES PATENTS

| | | |
|---|---|---|
| 2,573,928 | Peter | Nov. 6, 1951 |
| 2,755,093 | Peter et al. | July 17, 1956 |